US 6,715,609 B1

(12) United States Patent
Gupton

(10) Patent No.: US 6,715,609 B1
(45) Date of Patent: Apr. 6, 2004

(54) CASE FOR STORING AND DISPLAYING ARTICLES

(75) Inventor: Robert Gupton, McKinney, TX (US)

(73) Assignee: Gupton, Inc., McKinney, TX (US)

( * ) Notice: Subject to any disclaimer, the term of this patent is extended or adjusted under 35 U.S.C. 154(b) by 0 days.

(21) Appl. No.: 09/609,464

(22) Filed: Jul. 3, 2000

(51) Int. Cl.[7] .............................................. B65D 85/58
(52) U.S. Cl. .................. 206/457; 206/0.83; 206/308.1; 206/526; 206/455; 220/23.83; 220/523
(58) Field of Search .................. D28/83; 206/0.8, 206/0.81–0.84, 37, 39, 303, 307, 308.1, 308.2, 308.3, 310, 311, 455, 457, 514, 525, 526; 220/23.83, 523

(56) References Cited

U.S. PATENT DOCUMENTS

| | | | | |
|---|---|---|---|---|
| 2,998,126 A | * | 8/1961 | Jenkins | 206/0.83 |
| 4,425,997 A | * | 1/1984 | Grant | 206/0.84 |
| 4,736,840 A | * | 4/1988 | Deiglmeier | 206/308.1 |
| 5,191,972 A | * | 3/1993 | Helzer et al. | 206/0.84 |
| 5,246,107 A | * | 9/1993 | Long et al. | 206/311 |
| 5,476,173 A | * | 12/1995 | Opresco | 206/308.1 |
| 5,513,749 A | * | 5/1996 | Simmons | 206/308.1 |
| 5,579,905 A | * | 12/1996 | Ingber et al. | 206/457 |
| 5,613,612 A | * | 3/1997 | Davault | 206/308.1 |
| 5,971,143 A | * | 10/1999 | Yoshioka | 206/308.1 |
| D441,915 S | * | 5/2001 | Wardlaw | D28/83 |

* cited by examiner

*Primary Examiner*—Jim Foster
(74) *Attorney, Agent, or Firm*—James A. Harrison; Bruce E. Garlick

(57) ABSTRACT

A case is provided for storing and displaying articles. The case includes a substantially planar base and a substantially planar cover having a similar shape to that of the base and adapted for connection to the base to form an assembly. A peripheral connector is provided for connecting the cover to the base about the respective peripheries thereof, and a central connector is provided for connecting the cover to the base about the respective centers thereof. In a particular embodiment, the peripheral connector and the central connector define an annulus there between when the cover is connected to the base for storing and displaying articles. The case may be adapted for use in a compact disc jewel box having a square base and a square cover hinged to the base.

13 Claims, 13 Drawing Sheets

Figure 8A
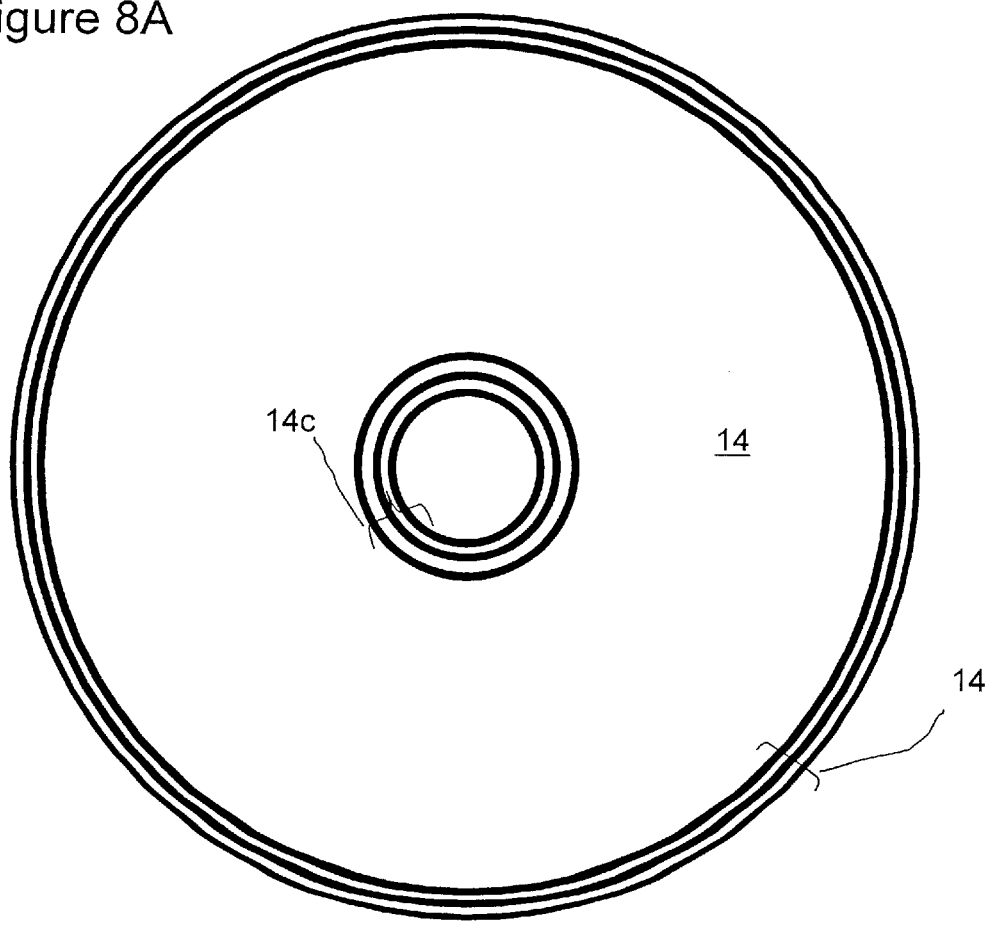
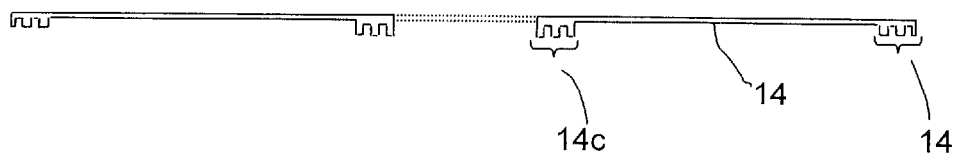
Figure 8B

CASE FOR STORING AND DISPLAYING ARTICLES

BACKGROUND OF THE INVENTION

1. Field of the Invention

This invention relates generally to cases for storing and displaying ornamental or valuable articles so that the articles may be easily viewed and appreciated.

2. Description of the Related Art

The related art of devices for storing and displaying ornamental or valuable articles is typified by U.S. Pat. Nos. 4,425,997 and 5,191,972, both of which are preferably used with coins. The '997 patent discloses a pair of rectangular plate members identical in size and configuration and adapted for assembly to one another by way of complementary ridges and channels that are aligned when the plate members are joined together in a particular orientation. Both plate members include central circular apertures therein defining viewing windows for an article to be stored and displayed. The article is placed between a pair of flexible, transparent sheets, which are positioned between the plate members. The edges of the transparent sheets are compressed by the plate members when the plate members are assembled. The '997 patent further discloses that a plurality of the plate member assemblies may be stored together in an apertured display board. Thus, the plate member assembly of the '997 patent is limited to the storage and display of only a single article, unless a plurality of such assemblies are arranged in a particular display board that includes precisely sized and shaped apertures.

The '972 patent discloses a storage and display device for coins similar to that of the '997 patent. Thus, an article such as a coin is held in a rectangular retaining member not unlike the plate member assembly described in the '997 patent. A plurality of such retaining members are positioned in a plurality of respective display compartments of a support member not unlike the apertures of a display board as described in the '997 patent. The '972 patent places the support member, or a plurality of such support members, within an album-like configuration wherein the support member(s) constitutes a page or leaf of the album. Like the '997 patent, the device of the '972 patent requires support member having precisely sized and shaped display compartments to accommodate article retaining members. The '972 patent is further limited in that only one side or face of the stored article may be displayed in the support members at any given time.

To address these shortcomings, it is a principal object of the present invention to provide a storage and display case that utilizes readily available storage devices rather than requiring a custom-designed display board or support member.

It is a further object of the present invention to utilize the so-called "jewel boxes" that are manufactured and sold in mass quantities for storing compact discs.

SUMMARY OF THE INVENTION

The objects described above, as well as various other objects and advantages, are achieved by a case for storing and displaying articles, including a substantially planar base and a substantially planar cover having a similar shape to that of the base and adapted for connection to the base to form an assembly. A peripheral connector is provided for connecting the cover to the base about the respective peripheries thereof, and a central connector is provided for connecting the cover to the base about the respective centers thereof. The peripheral connector and the central connector define an annulus there between when the cover is connected to the base for storing and displaying articles.

In one embodiment of the present invention, the case further includes an insert adapted for placement within the assembly of the cover and the base. The insert includes at least one aperture therein defining a compartment for storing and displaying articles. The aperture may reside atop or about the central connector, and is not necessarily limited to compliance with the annulus shape or volume.

In one embodiment of the present invention, the peripheral and central connectors each include a tongue and groove joint formed between the base and cover at the respective peripheries and central portions thereof.

In one aspect of the present invention, a case formed for use as a compact disc jewel box, the case having a rectangular base and a square cover hinged to the base, the case having a second base adapted for placement within the base of the jewel box, a second cover having a similar shape to that of the second base, and structure for connecting the second base to the second cover within the jewel box is adapted to store articles.

The structure for connecting includes an outer base wall that extends upwardly from the second base about the perimeter thereof and an outer cover wall that extends downwardly from the second cover about the perimeter thereof. The outer base wall and outer cover wall are respectively sized so as to define an interference or frictional fit between the two when the second cover is closed upon the second base. The second base and the second cover may be formed in various shapes. For example, they may be substantially circular, substantially rectangular, substantially pentagonal, substantially hexagonal, substantially octagonal, as well as other shapes.

The second base may be hingedly connected to the base of the jewel box, such that the second base may be rotated between the base and cover of the jewel box when the jewel box is opened. Also, the second cover may be hingedly connected to one of the base of the jewel box and the second base, such that the second cover may be rotated between the base and cover of the jewel box when the jewel box is opened.

In a preferred embodiment, the case of this aspect of the invention contemplates the use of a tray removably secured in the base of the jewel box and having a centrally located circular array of flexible spring fingers. The second base of this embodiment is equipped with a centrally located circular aperture, such that the second base may be removably secured to the base of the jewel box, via the tray, by engagement of the flexible spring fingers with the circular aperture.

The second base may also include an inner circular base wall that extends upwardly from the second base, thereby defining an annular area between the outer base wall and the inner circular base wall of the second base for storing and displaying articles. In this particular embodiment, the case may further include an insert having a central circular opening sized to fit about the inner circular base wall and an annular shape for fitting within the annular area, the insert having a plurality of openings therein about the central circular opening defining a plurality of storage areas. The plurality of openings may be formed in various shapes, such as, for example, circular or rectangular.

Alternatively, the insert may be equipped with a centrally located aperture defining a relative large central storage area.

The central aperture may be of various shapes, including rectangular or circular shape, and may reside atop the circular aperture and flexible spring fingers.

Preferably, at least one of the square base and the square cover of the jewel box is transparent. In certain embodiments, at least one of the second cover and the second base is transparent.

BRIEF DESCRIPTION OF THE DRAWING(S)

The manner in which the above recited features, advantages and objects of the present invention are attained can be understood in detail by reference to the preferred embodiments thereof which are illustrated in the appended drawings.

It is to be noted however, that the appended drawings illustrate only typical embodiments of this invention and are therefore not to be considered limiting of its scope, for the invention may admit to other equally effective embodiments.

In the drawings:

FIGS. 8A and 8B are plan and side elevational views of the top piece, or cover, of a case according to the present invention;

DETAILED DESCRIPTION OF THE INVENTION

Figure 1:
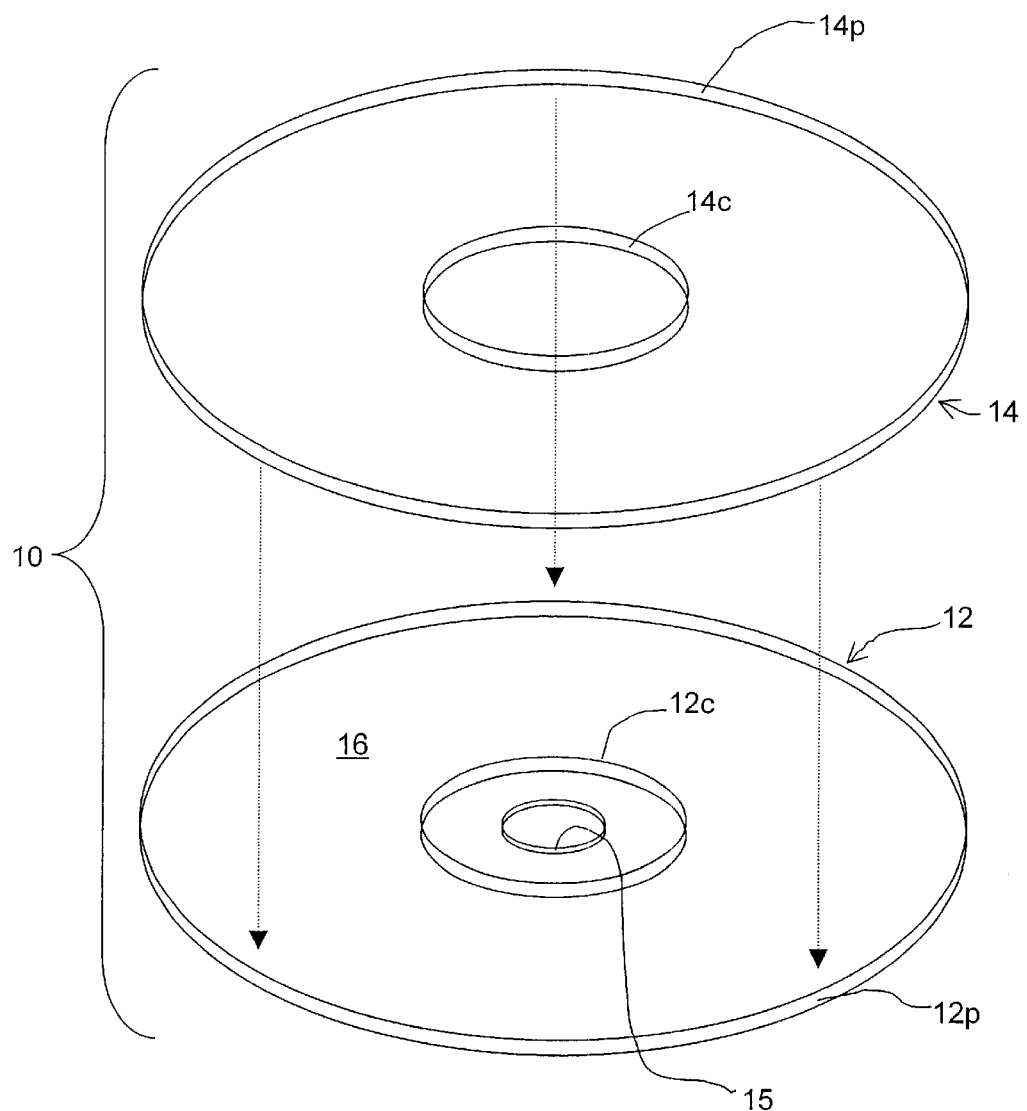
FIG. 1 illustrates one aspect of the present invention, a two-piece case for storing and displaying articles of value or interest.

FIG. 1 illustrates one aspect of the present invention in the form of a case 10 for storing and displaying articles of value or interest. Case 10 includes a substantially planar base 12 and a substantially planar cover 14 having a similar circular shape to that of the base and adapted for connection to the base to form an assembly. Both the base and the cover are molded of plastic, and preferably one or both are transparent to permit viewing of the article or articles stored therein without having to disassemble the case.

A peripheral connector is provided for connecting cover 14 to base 12 about the respective peripheries thereof, and includes peripheral wall 12p extending upwardly from base 12 and peripheral wall 14p extending downwardly from cover 14. A central connector is further provided for connecting cover 14 to base 12 about the respective centers thereof, and includes central wall 12c extending upwardly from base 12 and central wall 14c extending downwardly from cover 14. The peripheral connector and the central connector define an annulus 16 there between when the cover is connected to the base for storing and displaying articles. Base 12 further includes a central aperture 15 for a purpose that is described below.

Figure 2:
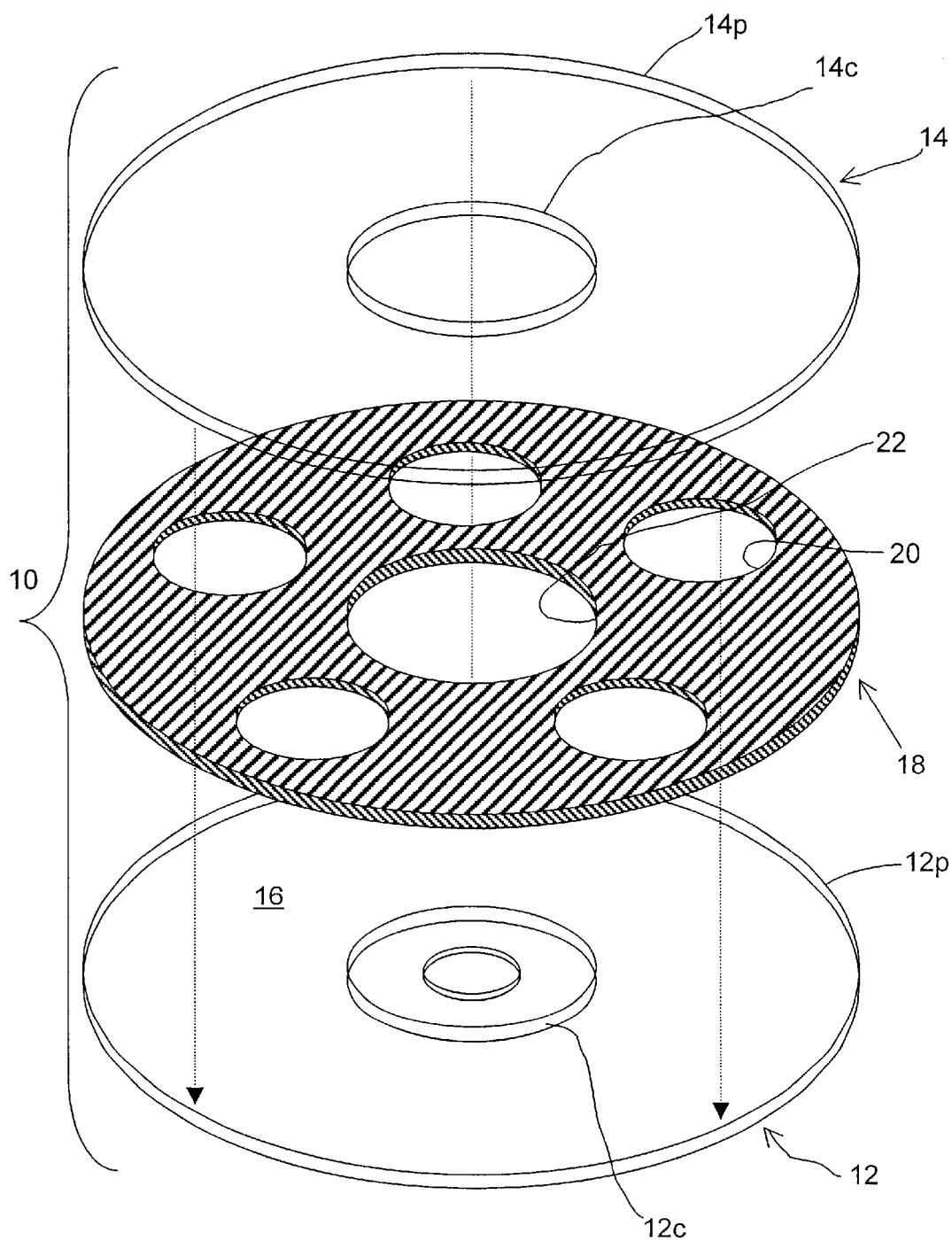
FIG. 2 illustrates the case of FIG. 1 supplemented with an insert having a plurality of apertures defining distinct storage compartments.

FIG. 2 shows case 10 being equipped with an insert 18 adapted for placement within annulus 16 defined by the assembly of cover 14 and base 12. Insert 18 includes a plurality of apertures 20 therein defining a plurality of respective compartments for storing and displaying articles. Insert 18 is further equipped with central aperture 22 for fitting about central walls 12c and 14c when such central walls are connected to one another. Similarly, the outer diameter of insert 18 is slightly less than the inner diameters of peripherals walls 12p and 14p so as to fit snugly within such peripheral walls when they're connected to one another.

Figure 3:
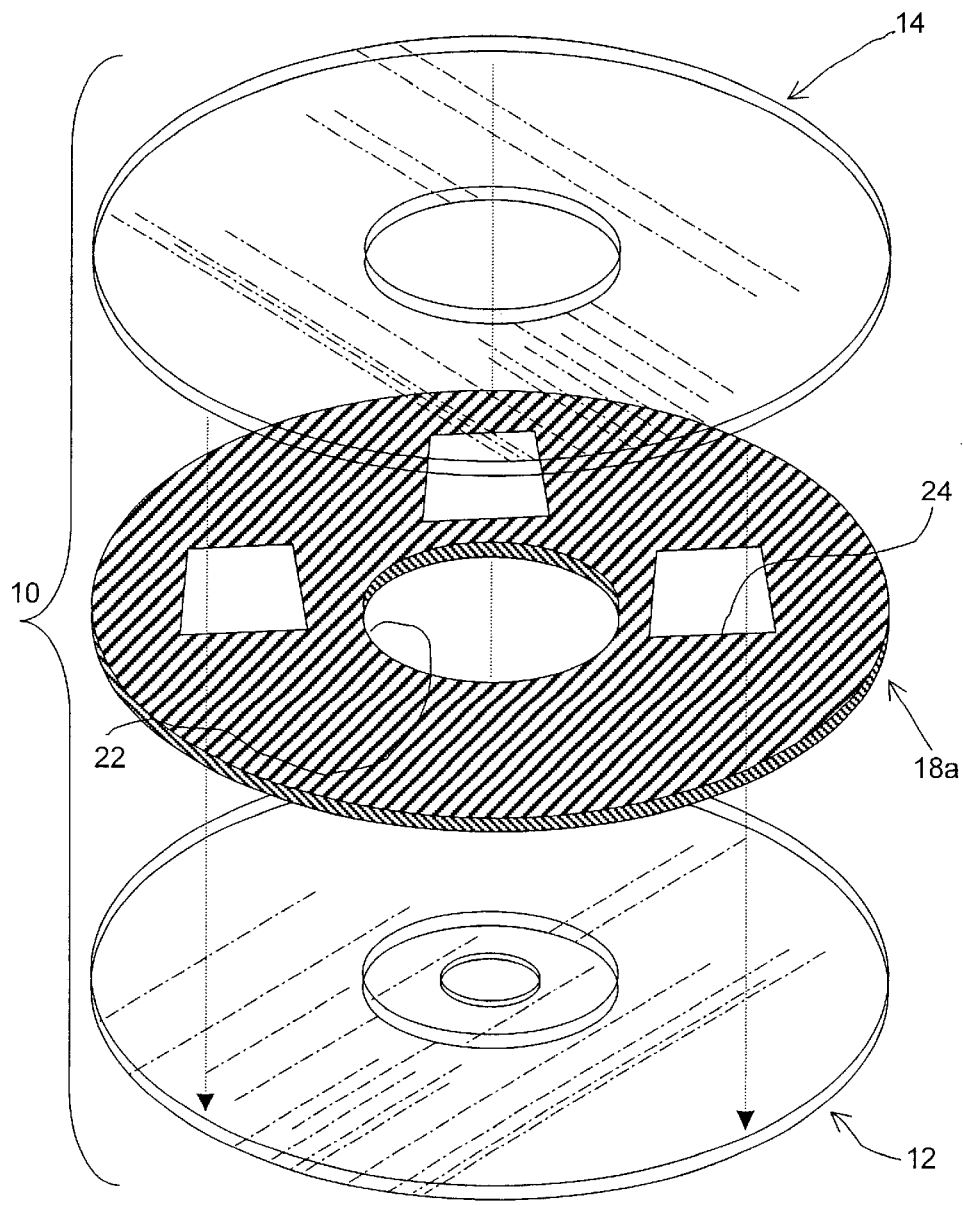
FIG. 3 is similar to FIG. 2, but illustrates an alternative insert for use with the case of FIG. 1.

FIG. 3 reveals an alternative embodiment of the insert, referenced as 18a. Insert 18a differs from insert 18 of FIG. 2 in that the former includes rectangular-shaped cavities 24 for storing and displaying articles having similar shapes such as stamps or medallions.

Figure 4:
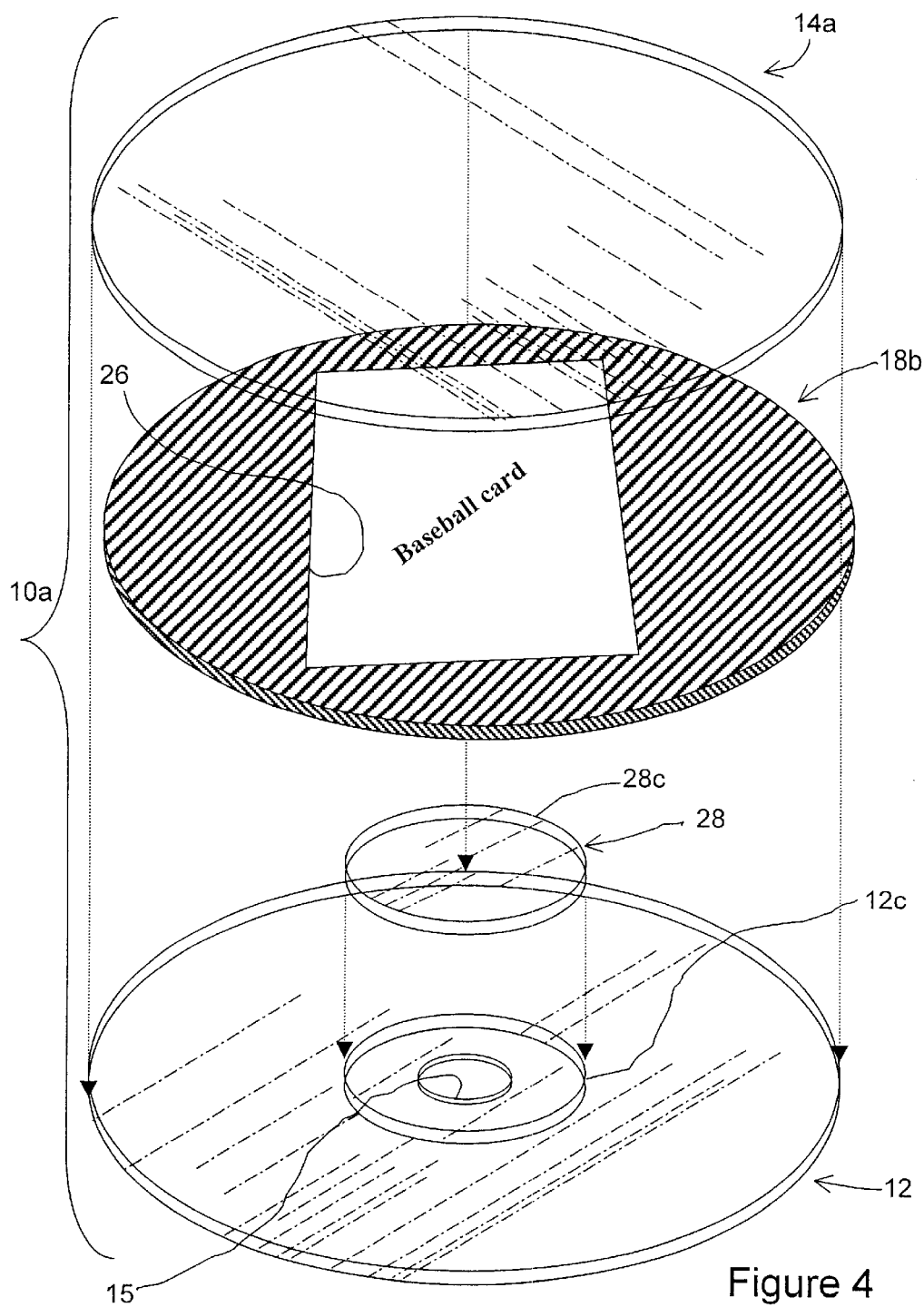
FIG. 4 illustrates a further alternative of the insert, with the insert having a single central, rectangular cavity defining a relatively large storage compartment.

FIG. 4 shows still another embodiment of the insert, labeled 18b, which includes a large central rectangular cavity 26 for storing articles such as collectible baseball cards and the like. For this purpose, cap 28 is provided to fit over aperture 15 and engage wall 12c with wall 28c of the cap. Insert 18b may be provided with a circular-shaped cavity on the bottom side thereof (not shown) for receiving cap 28, thereby ensuring a flush planar fit of insert 18b and cap 28 between base 12 and cover 14. In this embodiment of the case, referenced as 10a, cover 14a has no central wall for connecting to wall 12c of base 12.

Figure 5A:
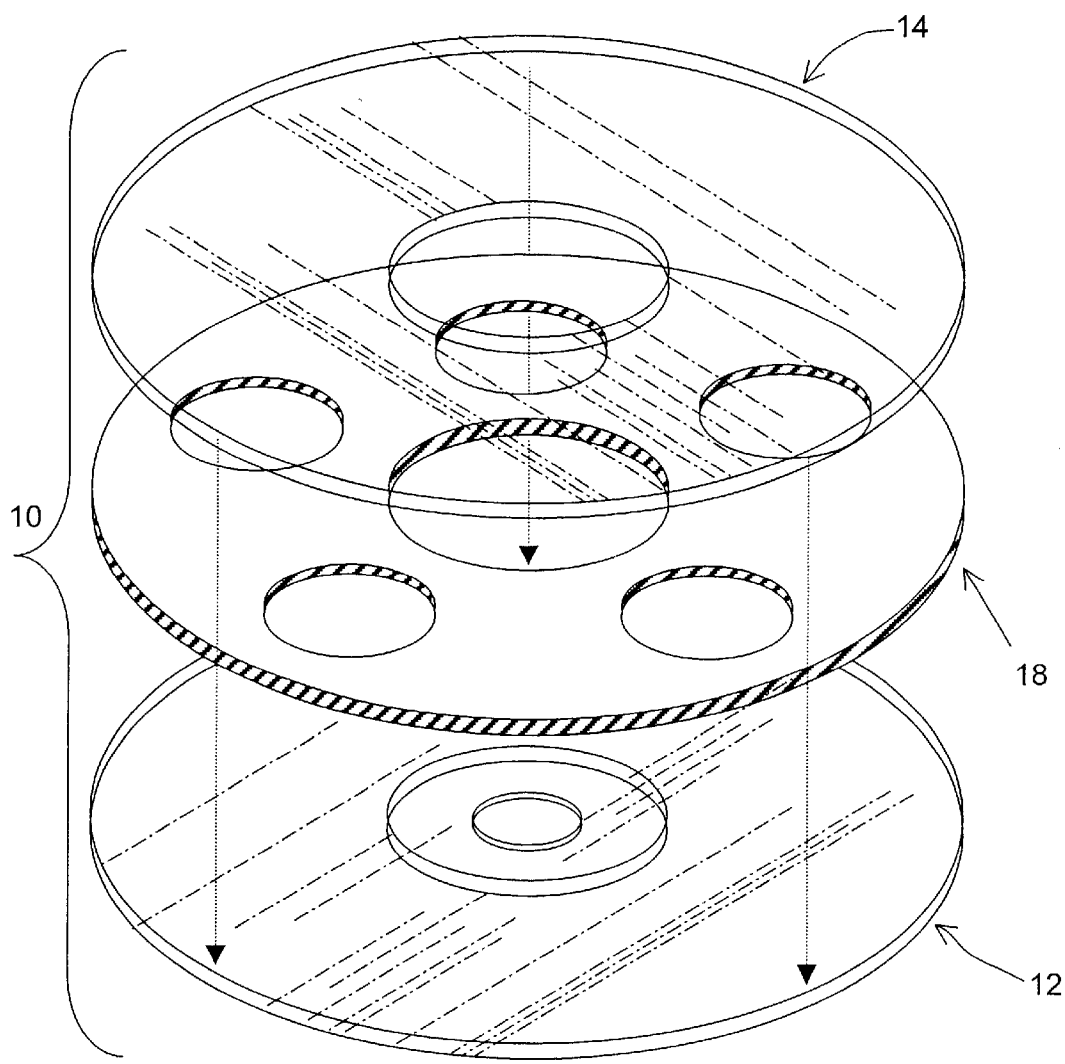
FIGS. 5A and 5B are sequential illustrations of the insert depicted in FIG. 2 being assembled within the two pieces of the case according to the present invention.
Figure 5B:
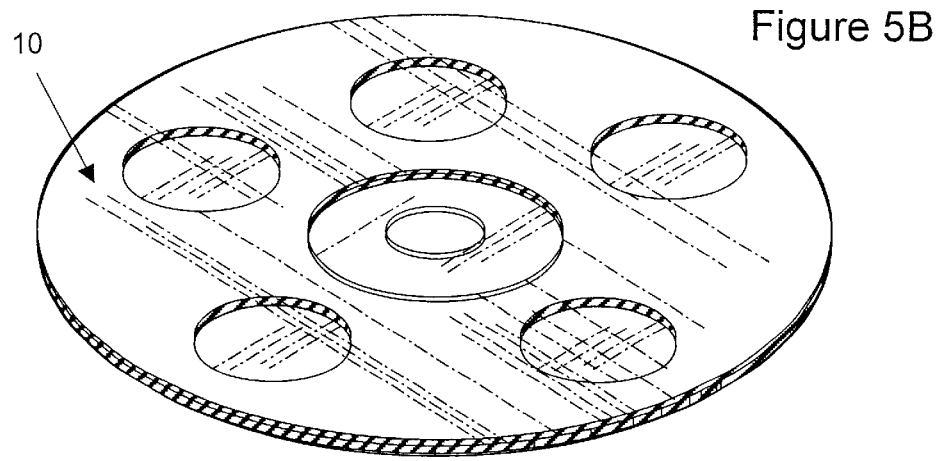
Figure 5C:
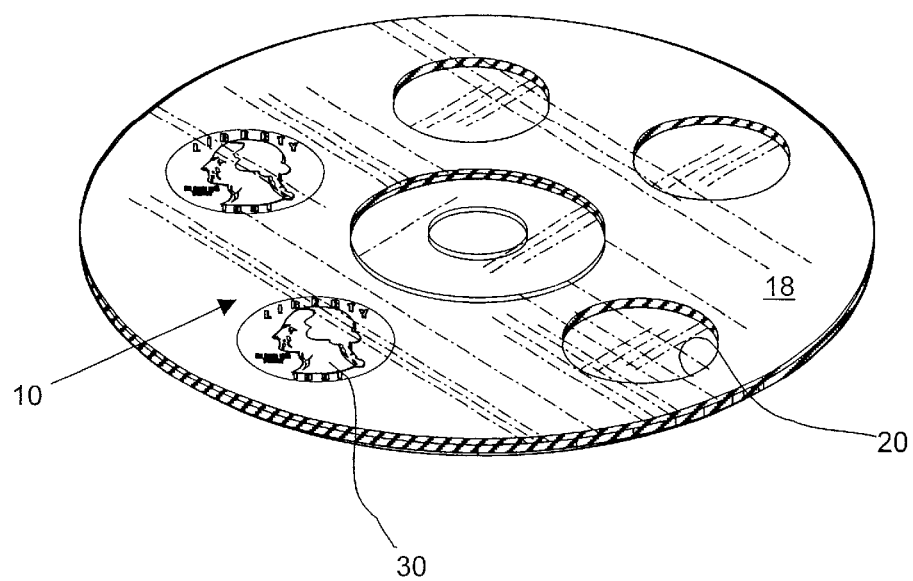
FIG. 5C shows the insert and case assembly of FIG. 5B supplemented with two coins placed in two of the respective compartments of the insert.

FIGS. 5A and 5B are sequential illustrations of insert 18 being assembled within base 12 and cover 14 of case 10. Thus, cover 14 is positioned over insert 18 and base 12, and the cover is pressed into frictional engagement with the base via the peripheral and central connectors to secure the insert there between. FIG. 5C shows case 10 as assembled in FIG. 5B, except the case includes two coins 30 that have been placed in two of the respective cavities or compartments 30 of insert 18 prior to the assembly of base 12 and cover 14. In this manner, coins or other valuables may be conveniently stored and displayed for easy viewing and appreciation. In one particular embodiment, insert 18 is formed to include four different sized cavities to respectively hold a penny, nickel, dime, and quarter. It is anticipated that this holder might be used to contain coins of the same year to commemorate a special event such as the year of a child's birth.

Figure 6:
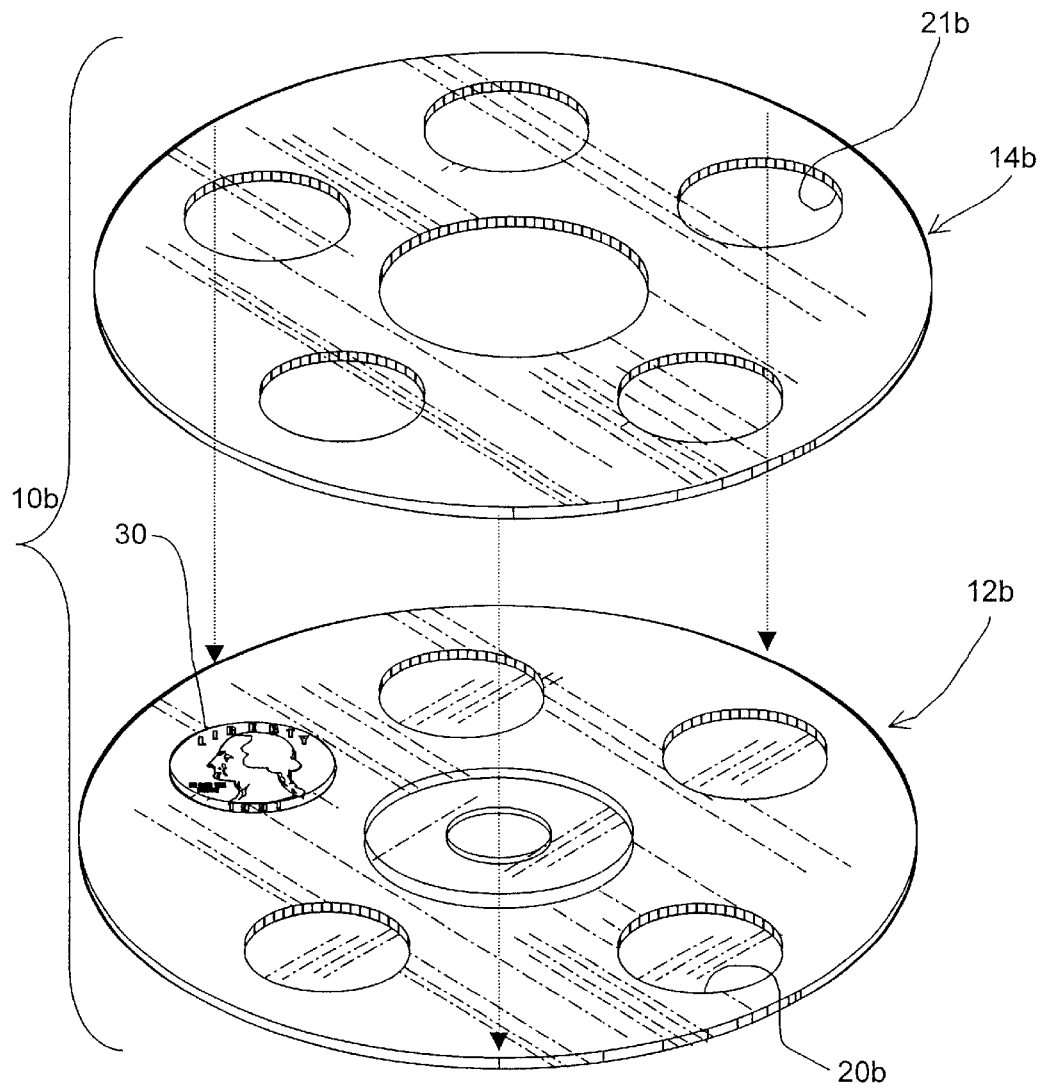
FIG. 6 illustrates an alternative embodiment of the case, wherein the two pieces include complementary cavities therein defining the storage compartments without the need for an insert.

FIG. 6 illustrates an alternative embodiment of the case, labeled as 10b, wherein base member 12b and cover member 14b each include complementary cavities 20b and 21b therein, respectively, defining the storage compartments without the need for an insert. Those skilled in the art will appreciate that such cavities may be pre-molded or otherwise cut through the base and cover members, and may be of various sizes and shapes.

Figure 7:
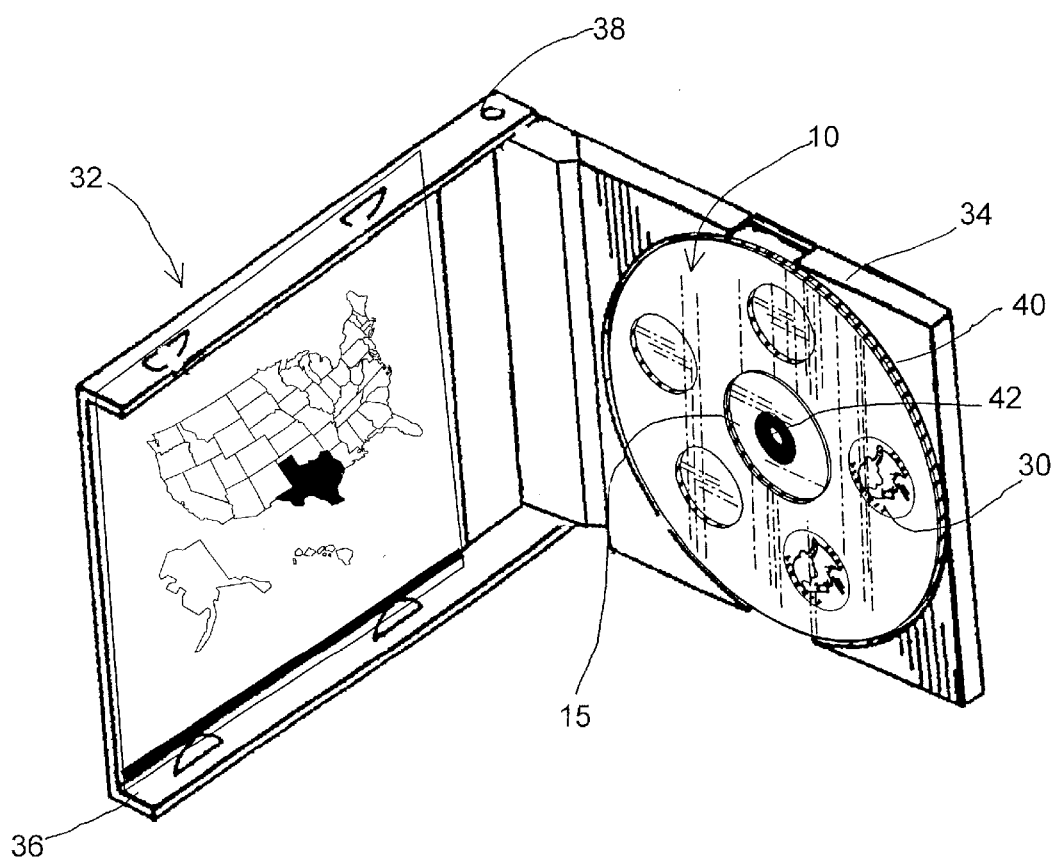
FIG. 7 illustrates another aspect of the present invention, wherein the case is assembled and secured within a compact disc jewel box for convenient storage and display of the articles therein.

FIG. 7 illustrates another aspect of the present invention, wherein case 10 is particularly suited for placement within a conventional compact disc "jewel box." Thus, a case such as case 10, 10a, 10b, or other embodiments thereof, are positioned in the cavity defined by compact disc jewel box 32. Case 10 is described hereafter for convenience. Jewel box 32 includes a square base 34 and a square cover 36 hinged together via pins 38 extending from base 34 for engagement with apertures in cover 36. Base 12 of case 10 may therefore be considered a second base in this configuration, and is adapted for placement within base 34 of jewel box 32. Similarly, cover 14 may be considered a second cover in this configuration, and, as mentioned above, has a similar circular shape to that of second base 12. As also described briefly above, case 10 further includes means for connecting second base 12 to second cover 14 within jewel box 32.

Figure 9A:
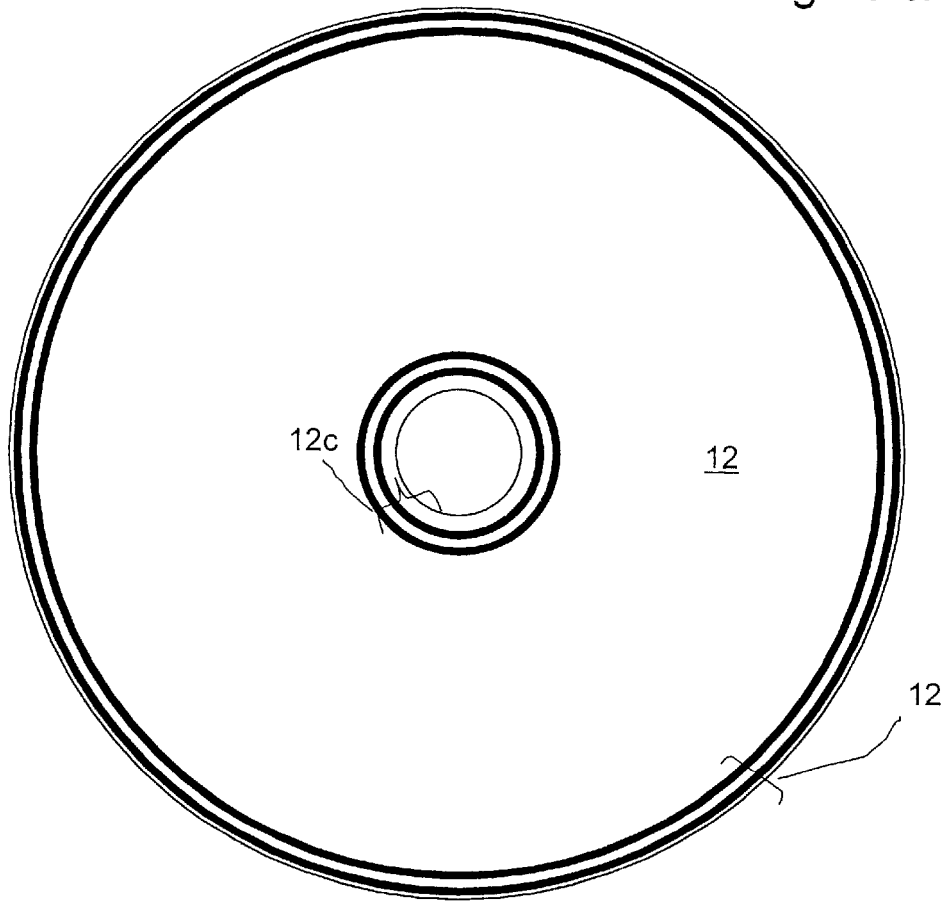
FIGS. 9A and 9B are plan and side elevation views of the bottom piece, or base, of a case according to the present invetion.
Figure 9B:
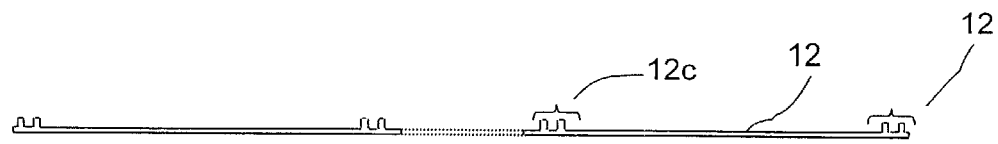
Figure 10:
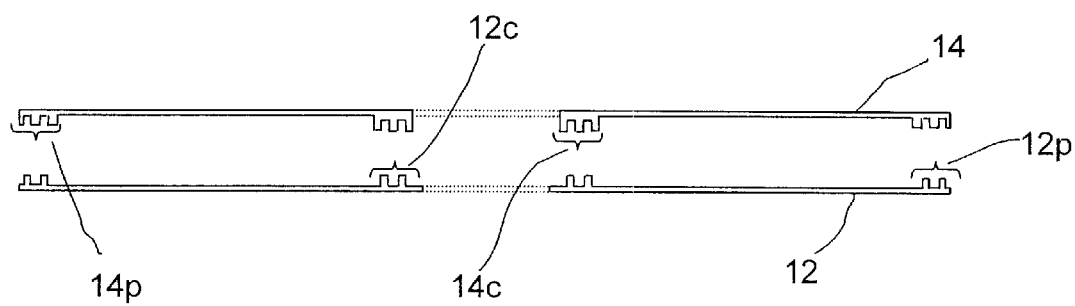
FIG. 10 shows the cover of FIG. 8B in a complementary position to the base of FIG. 9B for assembling the two together.

With reference now to FIGS. 8–10, the connecting structure is seen to include an outer base wall 12p that extends upwardly from second base 12 about the perimeter thereof, and outer cover wall 14p that extends downwardly from second cover 14 about the perimeter thereof. Wall 12p actually consists of two concentric ring-like members, while wall 14p consists of three concentric ring-like members, the resulting engagement between these walls being a tongue-and-groove assembly. In other words, outer base wall 12p and outer cover wall 14p are respectively sized so as to define an interference or frictional fit between the two when second cover 14 is closed upon second base 12.

Similarly, wall 12c consists of two concentric ring-like members, while wall 14c consists of three concentric ring-like members, the resulting engagement between these walls being a tongue-and-groove assembly. In other words, inner base wall 12c and inner cover wall 14c are respectively sized so as to define an interference or frictional fit between the two when second cover 14 is closed upon second base 12.

Figure 11:
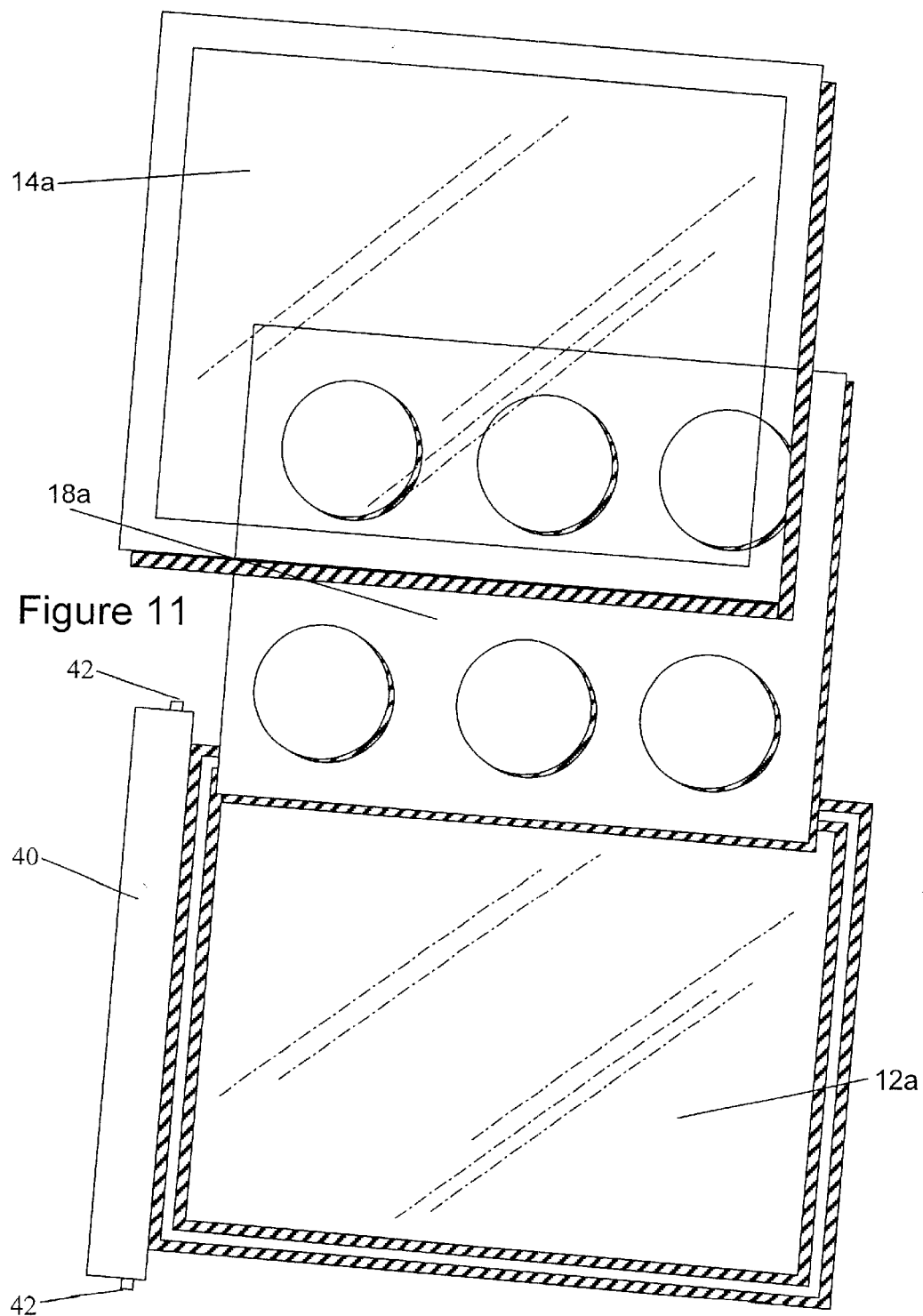
FIG. 11 illustrates an example of a rectangular second base and second cover.
Figure 12:
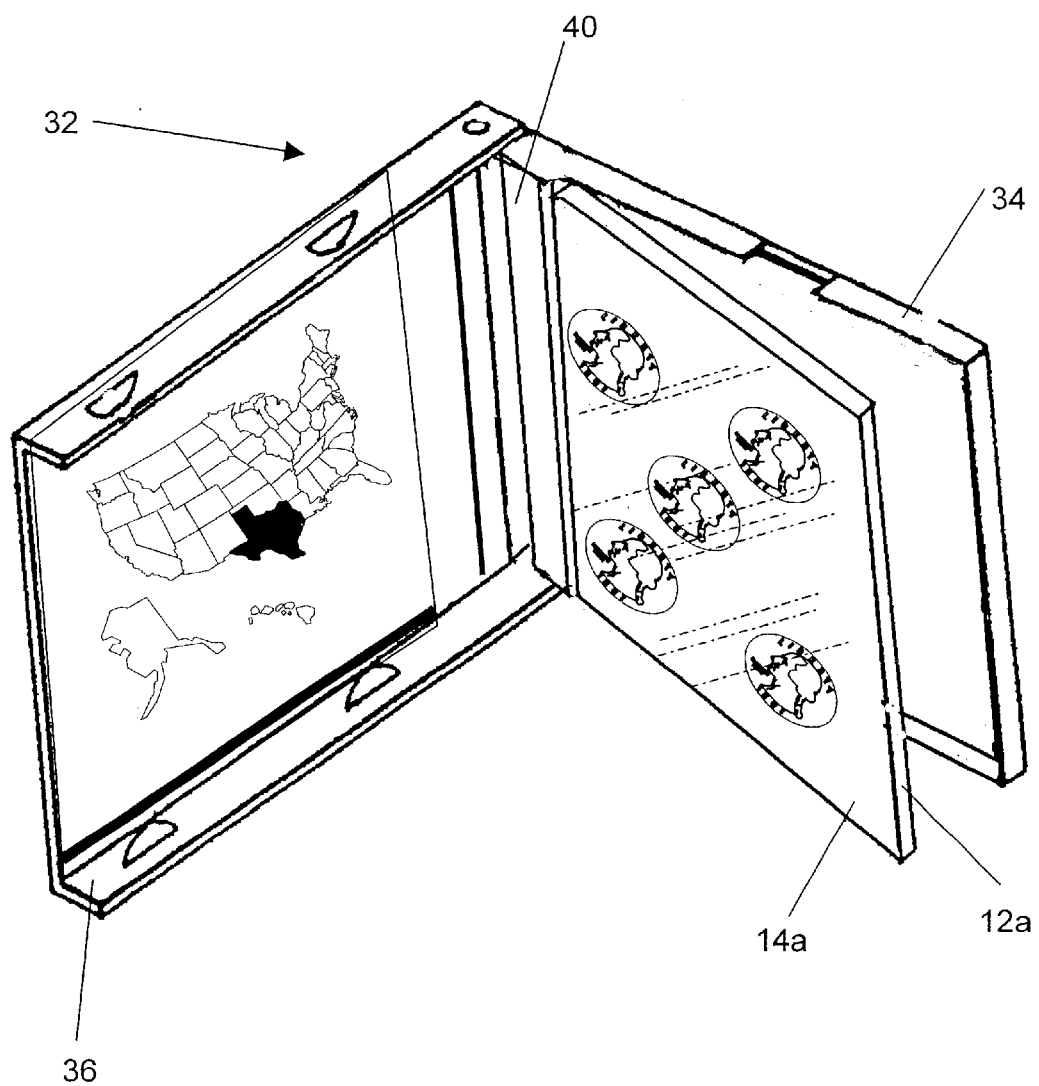
FIG. 12 illustrates an example of the rotation of the assembly of second cover connected to second base.

The second base and the second cover may be formed in various shapes. For example, they may be substantially circular as shown, substantially rectangular, substantially pentagonal, substantially hexagonal, substantially octagonal, as well as other shapes. Examples of a rectangular second base 12a and second cover 14a are illustrated in FIGS. 11 and 12.

Second base 12a may be hingedly connected to the base 34 of the jewel box 32, for example, by attachment to an elongated member 40 that's secured to base 34 via pins 42 and corresponding apertures (not shown) in base 34, such that second base 12a may be rotated between the base 34 and cover 36 of jewel box 32 when the jewel box is opened. Also, second cover 14a may be connected to second base 12a (as seen in FIGS. 11 and 12), or otherwise hingedly connected to one of the base 34 of the jewel box and the second base 12a (not shown), such that the second cover 14a may be rotated between the base 34 and cover 36 of jewel box 32 when the jewel box is opened. FIG. 12 illustrates the rotation of the assembly of second cover 14a connected to second base 12a, securing rectangular insert 18a holding coins in apertures therein, between base 34 and cover 36 of jewel box 32.

Case 10 may be further equipped, as seen in the embodiment of FIG. 7, with tray 40 removably secured in base 34 of jewel box 32 and having a centrally located circular array of flexible spring fingers 42. Second base 12 of this embodiment is equipped with a centrally located circular aperture 15 (see also FIG. 1), such that second base 12 may be removably secured to base 34 of jewel box 32 by engagement of flexible spring fingers 42 with circular aperture 15.

In view of the foregoing it is evident that the present invention is well adapted to attain all of the objects and features hereinabove set forth, together with other objects and features which are inherent in the apparatus disclosed herein.

The present invention is particularly advantageous in that coin holders as well as other types of display cases may be formed by cases adapted for use with jewel boxes made for holding compact disks (CDs). Thus not only may a broken jewel box be readily replaced, but cost to the consumer is reduced. One reason is that the present invention facilitates the use of existing and readily available structures for displaying articles of value. As will be readily apparent to those skilled in the art, the present invention may easily be produced in other specific forms without departing from its spirit or essential characteristics. The present embodiment is, therefore, to be considered as merely illustrative and not restrictive. The scope of the invention is indicated by the claims that follow rather than the foregoing description, and all changes, which come within the meaning and range of equivalence of the claims, are therefore intended to be embraced therein.

What is claimed is:

1. A case for storing and displaying articles, the case comprising:
    a compact disc jewel box having a first base and a first cover hinged to the first base, both of which are rectangular;
    a substantially rigid second base adapted for placement within the first base of the jewel box;
    a second cover having a similar shape to that of said second base and adapted for connection to said second base to form an assembly substantially filling the interior volume between the first base and first cover; and
    wherein the second cover and second base are formed of transparent material to allow viewing of the articles stored therein for display and are arranged to allow viewing without obstruction.

2. The case of claim 1, further comprising structure for connecting at least one of said second base and said second cover to the jewel box.

3. The case of claim 2, wherein said structure for connecting includes a hinged joint, whereby the assembly of said second base and said second cover may be pivoted as a unit with respect to the jewel box when it is opened.

4. A case for storing and displaying articles comprising:
    a compact disc jewel box having a square base and a square cover hingedly attached to the square base;
    a second base adapted for placement within the base of the jewel box;
    a second cover having a similar shape to that of said second base, the second base and second cover substantially filling the interior volume between the square base and square cover; and
    means for connecting said second base to said second cover within the jewel box.

5. The case of claim 4, wherein said connecting means includes an outer base wall that extends upwardly from said second base about the perimeter thereof and an outer cover wall that extends downwardly from said second cover about the perimeter thereof, the outer base wall and outer cover wall being respectively sized so as to define a removable securing interference fit between the two when said second cover is closed upon said second base.

6. The case of claim 5, wherein said second base and said second cover are substantially rectangular.

7. The case of claim 4, wherein at least one of said second cover and said second base is transparent.

8. A display box, comprising:
   a rectangular compact disk jewel box having a first base and a first cover hingedly attached on said first base for opening and closing said jewel box;
   a closed case for holding an article, said case including a second base, a second cover and an insert, said insert located between said second base and said second cover and having an aperture for receiving an article therein, said second cover peripherally connected to said second base and covering said aperture; and
   said closed case being located within said jewel box and being hingedly connected to said jewel box so that said closed case is adapted to pivot as a unit with respect to the jewel box when the jewel box is opened.

9. The display box of claim 8, wherein at least one of said second cover and said second base is transparent.

10. The display box of claim 8, wherein the second cover and second base are substantially rectangular.

11. The display box of claim 8 wherein the said insert is transparent.

12. A display box, comprising:
   a rectangular compact disk jewel box having a first base and a first cover hingedly attached on said first base for opening and closing said jewel box;
   a closed case for holding an article, said case including a second base, a second cover and an insert, said insert located between said second base and said second cover for receiving an article therein, said second cover peripherally connected to said second base;
   said closed case being located within said jewel box and removably secured in the first base of the jewel box; and
   wherein said first cover of said jewel box and said closed case being formed of transparent material.

13. The display box of clam 12 wherein the second cover and second base are substantially rectangular.

\* \* \* \* \*